United States Patent [19]

Butcher

[11] 4,429,187

[45] Jan. 31, 1984

[54] AUDIO DISTRIBUTING SYSTEM

[75] Inventor: James S. Butcher, Glendale Heights, Ill.

[73] Assignee: GTE Automatic Electric Labs Inc., Northlake, Ill.

[21] Appl. No.: 334,189

[22] Filed: Dec. 24, 1981

[51] Int. Cl.³ .................. H04M 1/21; H04M 1/20
[52] U.S. Cl. .................... 179/81 R; 179/99 H; 381/80; 381/93
[58] Field of Search .......... 179/99 H, 99 LC, 99 R, 179/1 B, 81 R, 1 FS

[56] References Cited

U.S. PATENT DOCUMENTS 4,149,042  4/1979  Balzer et al. .................. 179/99 H Primary Examiner—Stafford D. Schreyer
Attorney, Agent, or Firm—Robert J. Black; Charles A. Doktycz

[57] ABSTRACT

A system for distributing signals from an audio source to key telephone station instruments is disclosed. By controlling the impedance relationship between the station instruments, lines and amplifier output, cross-feeding of signals from one station instrument to another or back-feeding of signals to the audio source is prevented.

4 Claims, 1 Drawing Figure

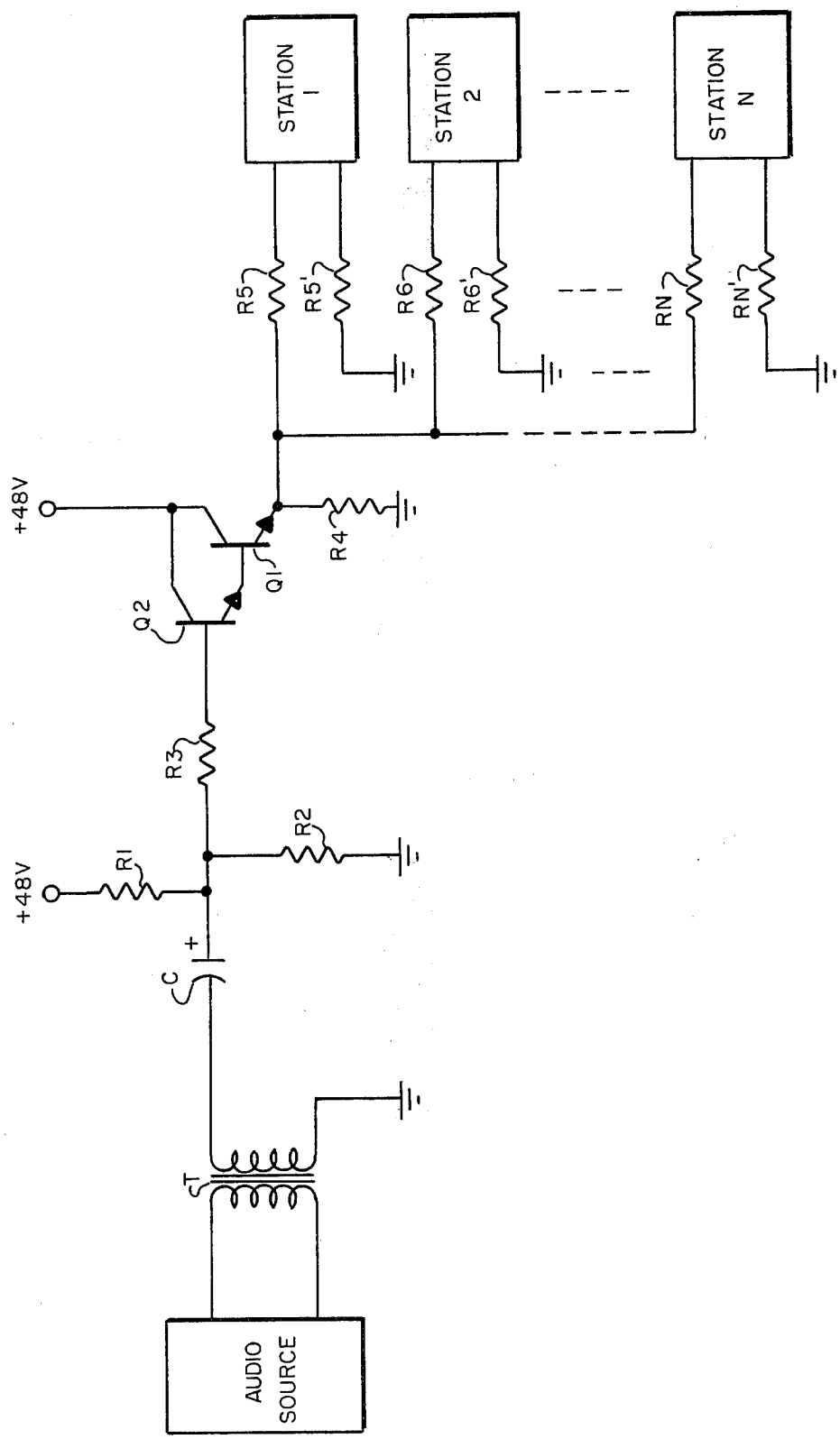

4,429,187

AUDIO DISTRIBUTING SYSTEM

BACKGROUND OF THE INVENTION

(1) Field of the Invention

The present invention relates in general to audio distribution system, and more particularly to an arrangement for distribution of audio program material to key telephone system station instruments.

(2) Description of the Prior Art

The use of audio program material in telephone systems is well known as may be witnessed by the existence of U.S. Pat. No. 1,159,855, issued Nov. 9, 1915, to Talbot G. Martin, describing a special service telephone system for providing subscribers with music, news, information, etc. from a central distributing source. Provided in this invention is a loadspeaking telephone receiver which may be bridged across the subscriber's line. At a central station, a special transmitting circuit is bridged across the subscriber's line to provide the line with the above mentioned program material. The subscriber, by merely operating a key or throwing a switch, can connect his loudspeaking receiver directly to the transmitting circuit and thus receive the program material.

More recently, the use of music has appeared in the area of key telephone systems to reassure a central office subscriber that a connection to the key telephone system still exists when such subscriber is placed "on-hold" by a key telephone system user. Such an application is described in U.S. Pat. No. 3,909,553, issued Sept. 30, 1975, to Rickard A. Marshall.

A still more recent application of music in telephone systems is found in the EK-308 Electronic Key Telephone System manufactured by TIE/COMMUNICATIONS, INCORPORATED. Disclosed therein is an arrangement for distributing music to central office subscribers placed in a hold condition, in the usual manner noted above sometimes referred to as "Music-On-Hold". Also included in the provision of music to key telephone station instruments in the "on-hook" state sometimes known as "Background" music. Background music finds use in key telephone systems installed in offices or other locations to block out ambient noise.

Background music is provided in the above system from a music source through inputs connected to an isolation transformer and therefrom to control and signal limiting circuitry which govern signal levels and distribute the signal. Additional transformance for isolation are provided between the music control circuitry and each of the associated key telephone stations. Such a system is costly because it employs transformer isolation for each station line.

Accordingly, it is the object of the present invention to provide an improved arrangement for the provision of background music in key telephone systems, that eliminates the use of costly transformers associated with each telephone line.

SUMMARY OF THE INVENTION

The present invention consists of an arrangement for distributing signals from an audio program source through audio distribution apparatus to multiple key telephone stations over lines associated with each station. The audio distribution apparatus is powered from a source of DC power and includes isolation means and coupling means. The coupling means comprise a transformer connected to the audio program source, and filter circuitry connected between the transformer and the isolation means. The isolation means comprises impedance transformation circuitry connected to the coupling means filter circuitry, and line balancing means connected to the impedance transformation means and to each key telephone station's line.

In operation, signals from the audio program source pass through the coupling means transformer to isolate the audio program source from the subject invention. Following its passage through the coupling transformer, the signal passes through filter circuitry which prevents distortion of the signal by noise from the power source. The signal is then passed through impedance transformation circuitry, and fed to each key telephone station line through line balance circuitry. The line balance circuitry distributes signals to the key telephone station lines through individual resistor pairs, selected to provide longitudinal balance. Station-to-station isolation is achieved through the combined action of the line balance resistors, and impedance transformation circuitry.

BRIEF DESCRIPTION OF THE DRAWING

The accompanying drawing is a schematic circuit diagram of an audio distribution arrangement in accordance with the present invention.

DESCRIPTION OF THE PREFERRED EMBDOIMENT

Referring now to the drawing in which are shown multiple stations labeled STATION 1 through STATION N each having a similar characteristic impedance and connected to one side of a respective pair of line balancing resistors. That is, resistors R5 and R5' are connected to STATION 1, R6 and R6' are connected to STATION 2, and RN and RN' are connected to STATION N. The other ends of resistors R5, R6, and RN are connected in common forming a point through which all stations may be simultaneously fed signals. The other ends of resistors R5', R6', and RN' are connected to ground.

A distribution amplifier is provided comprising first transistor Q1 and second transistor Q2 each having an emitter, base, and collector. First transistor Q1's base is connected to second transistor Q2's emitter, transistors Q1 and W2 are connected to an unregulated +48 V DC power source (not shown) by way of each transistor's collector, and transistor Q1's emitter is connected to ground through amplifier output bias resistor R4. First transistor Q1's emitter is also connected to the common point of resistors R5, R6, and RN.

Resistors R1 through R3 are provided with their first ends connected together, and second ends connected to +48 V, ground, and the base of transistor Q2 respectively forming an input bias and signal feed network for the distribution amplifier.

Transformer T is provided with one end of its secondary winding connected to ground and a second end connected to the common point of resistors R1 through R3 through filter capacitor C. The primary winding of transformer T is connected across the audio program source.

Operation of the present invention may be understood by considering the accompanying drawing wherein, transformer T couples an audio signal from the audio source to the base of transistor Q2 via capacitor C and resistor R3. Transistors Q1 and Q2 are arranged in a Darlington configuration employed as an emitter follower amplifier stage. Such as arrangement provides a high input impedance and a low output impedance with a voltage gain of almost 1:1. Thus, the AC signal appearing at the emitter of Q1 is about the same in amplitude as the signal at the base of transistor Q2, but has a substantially lower source impedance.

Capacitor C is selected to cause little signal decrease between the secondary winding of transformer T and the base of transistor Q2. Transformer T presents a low impedance to ground for noise signals such as 120 KZ ripple, which may be impressed across its secondary winding. Resistors R1 and R2, capacitor C, and transformer T's secondary winding cooperate forming an R-C filter to prevent the above mentioned noise signals from affecting signals passing through the two last mentioned components from the audio program source.

Resistor R3 limits current and thereby prevents destruction of transistor Q2 due to excess currents which would otherwise flow from the unfiltered +48 V DC power source through the collector-base junction of transistor Q2, resistor R3, capacitor C, and the secondary winding of transformer T to ground during periods of momentary junction breakdown within transistor Q2 caused by spurious high voltage noise pulses from the power supply.

The signal appearing at the emitter of transistor Q1 is distributed to each station's line conductors through respective resistor pairs (R5 and R5' through RN and RN') feeding stations 1 through N respectively. All distribution resistors are of equal value and selected to be approximately 10 times greater in value than the characteristic impedance of the key telephone station instruments when paired up. Each distribution resistor pair in conjunction with the key telephone station instrument characteristic impedance will thus form a voltage divider producing a station signal level approximately one-tenth of that at the emitter of transistor Q1.

The distribution amplifier's output impedance is low enough when compared to the impedance presented to it by all stations, lines, balance resistors, and output resistor R4 to provide isolation between the stations thus, preventing transients or other spurious signals which may occur at one of the stations, from feeding over to other stations. For example, signals generated by station 1 are attenuated as they pass through line balancing resistors R5 and R5'. The thus attenuated signals are presented to the distribution amplifier output connection point where the amplifier's low output impedance dissipates any remaining signal, leaving no signal to be conducted to other stations through their respective line balancing resistor pairs.

Immunity from longitudinally induced noise is achieved for each station line through use of distribution resistances of identical value in each conductor of that station's line as described above. Thus, signals induced simultaneously in both conductors of a station's line in the same direction will generate like potentials across the station's line balance resistors. Since these potentials are of the same polarity and are of equal magnitude they will fail to generate a potential difference across the line's two conductors and thus not be sensed by the station.

The present invention has been described with reference to the preferred embodiment, however various other configurations could be substituted by those skilled in the art. Therefore the above description and the accompanying drawing should be interpreted as illustrative only, the subject invention being limited only as set forth in the claims.

What is claimed is:

1. An audio system including an audio program source, a plurality of key telephone stations each having a predetermined characteristic impedance, and means for distributing audio signals from said program source to said stations over a plurality of lines, each line associated with and connecting said distributing means to one of said stations, said distributing means comprising:

isolation means transferring signals received from said program source to said stations over said lines but inhibiting signals generated by any one of said stations from being transferred back to said program source or any other of said stations;

coupling means disposed between said program source and said isolation means, coupling audio signals from said audio source to said isolation means; and said isolation means including a plurality of series circuits, each including a pair of equal value resistors and an associated one of said stations connected therebetween via said associated line, each of said pairs of resistors conducting signals to said station associated therewith from said coupling means while maintaining immunity from noise longitudinally induced in said associated line.

2. An audio system as claimed in claim 1 wherein: said isolation means further includes impedance transformation means connected between said coupling means and said resistors.

3. An audio system as claimed in claim 2 wherein: said impedance transformation means comprises a transistorized emitter follower.

4. An audio system as claimed in claim 1 wherein: said coupling means comprises a transformer connected to said program source, and filter means connected between said transformer and said impedance transformation means.

* * * * *